Dec. 7, 1948.  E. H. SCHMIDT, JR  2,455,610
HARMONIC TWO-PHASE MOTOR DAMPING CIRCUITS
Filed Aug. 25, 1944
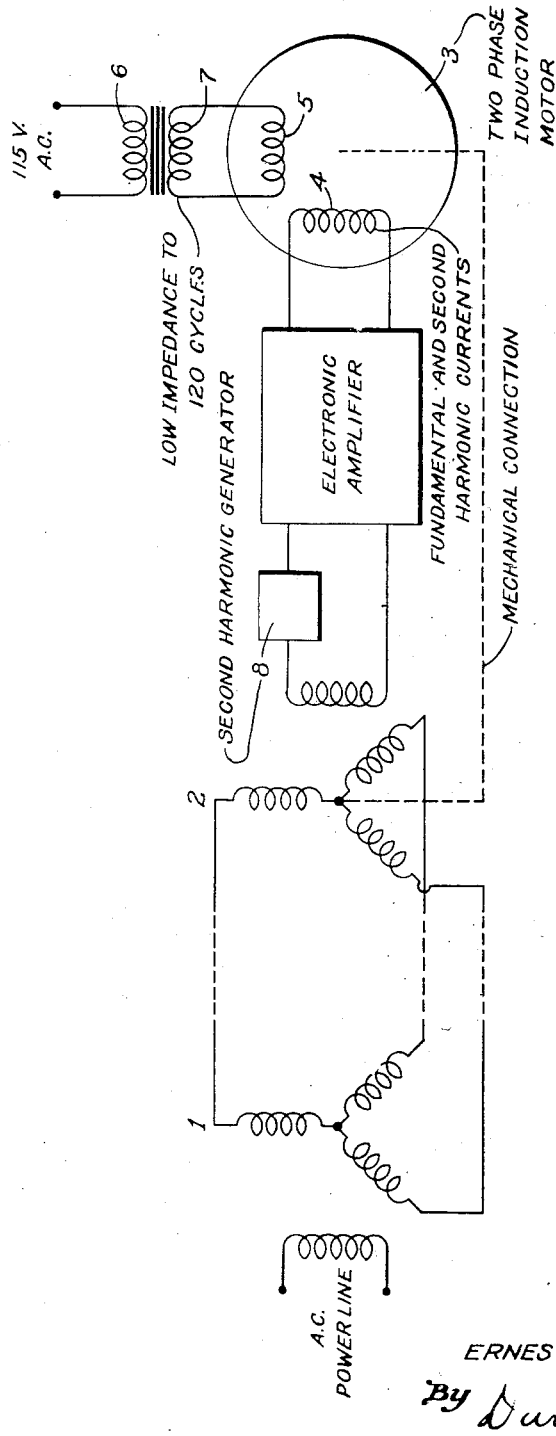
Inventor,
ERNEST HENRY SCHMIDT, JR.
By Darby & Darby
Attorneys Patented Dec. 7, 1948

2,455,610

UNITED STATES PATENT OFFICE 2,455,610

HARMONIC TWO-PHASE MOTOR DAMPING CIRCUITS

Ernest Henry Schmidt, Jr., Williamstown, Mass., assignor, by mesne assignments, to Remco Electronic, Inc., New York, N. Y., a corporation of New York Application August 25, 1944, Serial No. 551,199

7 Claims. (Cl. 318—211)

In the copending applications of Francis H. Shepard, Jr., Serial No. 499,774, filed August 24, 1943, Serial No. 563,566 filed November 15, 1944, Serial No. 572,209 filed January 10, 1945, and Serial No. 564,112 filed November 18, 1944, there is disclosed a follow-up device in which an alternating current error signal is supplied to an electronic amplifier and the output current of the amplifier drives a device to restore a condition of balance to remove the error signal.

The present invention is for a method and means of damping a follow-up device employing an alternating current error signal and in which a two phase motor is driven by the output of the amplifier.

A feature of my invention is the supply of current of a harmonic of the power frequency to one winding of such a motor but not to the other, in order to provide damping.

In the drawings, the figure is a schematic diagram of an embodiment of my invention.

It is known to those versed in the art, that a two phase A. C. motor operated with one phase winding continuously excited, and a varying current passed through the other phase winding, that the acceleration of the motor is directly proportional to the amount of current passed through the controlled winding over a substantial part of the motor speed range. This means that the position of the motor is a function of the second integral of the current passed through the control winding. As is well known to those versed in the art, such a motor used in servo mechanisms, presents a fairly difficult stabilizing problem.

If the motor is made to have a direct current versus speed characteristic, the position of the motor will be a direct function of only the first integral of current. This would simplify damping or stabilizing problems.

In the copending application of Francis H. Shepard, Jr. Serial No. 563,573, filed November 15, 1944, it is explained how D. C. excitation of one or both fields caused a drag directly proportional to armature speed to be placed on the motor thereby causing the motor to have a linear current versus speed characteristic over a substantial part of its characteristic.

It is known to those versed in the art that a two phase motor will run when only one phase winding is excited if the motor is given an initial start. It is also known that the same motor will not run if the field not excited is short circuited. In fact, if one field is excited while the other field is shorted, the motor will resist rotation with a torque that is directly proportional to the speed of rotation. It has been found that a motor operating with one frequency applied to both fields, will operate when proper phase relations exist, as explained above, so that its speed will be approximately proportional to the second integral of current in the control phase winding. If, however, another frequency is passed through one of the windings while the supply transformer to the other winding is an effective short circuit for this frequency, the velocity proportional drag thereby induced, as explained above, will cause the motor to have a characteristic such that the speed will be proportional to the current through the control phase. The frequency of the damping current may be any value that does not beat with the main power frequency. I have found that a convenient method of obtaining this second frequency is by introducing the second harmonic of the power supply into the amplifier feeding the control phase winding. This second harmonic voltage can be derived directly from the B supply ripple.

The drawing illustrates an error signal supplied by a synchronous transformer having a director 1 and a follower 2 which is driven by a two phase induction motor 3. The error signal from the follower 2 is supplied to an electronic amplifier and from the output of the amplifier to one phase 4 of the motor. The other phase 5 of the motor is supplied from the power line through a transformer having a primary 6 and a secondary 7. I have illustrated a second harmonic generator 8 in the electronic amplifier which will generate a frequency which is the second harmonic of the power frequency or 120 cycles in the usual case. Current of this frequency will, therefore, be supplied to the motor winding 4. The secondary 7 is made to have a low impedance for this frequency so that it is effectively not present in the winding 5.

It will be understood by those skilled in the art that my invention is capable of various modifications and I do not, therefore, desire to be restricted to the particular details shown but only within the scope of the appended claims.

What is claimed is:

1. A follow-up device employing an alternating current error signal and including a two phase induction motor in which both windings of the motor are supplied with current of the power frequency displaced in phase, and means for supplying one winding with current of the second harmonic of the power frequency, the other winding being short-circuited for said second harmonic.

2. A follow-up device employing an alternating current error signal and including a two phase induction motor in which both windings of the motor are supplied with current of the power frequency displaced in phase, and means for supplying one winding with current of a harmonic of the power frequency, the other winding being short-circuited for said harmonic.

3. A follow-up device employing an alternating current error signal and including a polyphase induction motor in which two windings of the motor are supplied with current of the power frequency displaced in phase, and means for supplying one of said two windings with current of the second harmonic of the power frequency, the other winding being short-circuited for said second harmonic.

4. A follow-up device employing an alternating current error signal and including a polyphase induction motor in which two windings of the motor are supplied with current of the power frequency displaced in phase, and means for supplying one of said two windings with current of a harmonic of the power frequency, the other winding being short-circuited for said second harmonic.

5. The method of damping a follow-up device employing an alternating current error signal and a two phase induction motor which consists in supplying one winding of the motor with the fundamental and a harmonic of the power frequency supplying the other winding with the fundamental only of the power frequency and short-circuiting said other winding for said harmonic.

6. The method of damping a follow-up device employing an alternating current error signal and a polyphase induction motor which consists in supplying one winding of the motor with the fundamental and a harmonic of the power frequency, another winding with the fundamental only of the power frequency and short-circuiting said other winding for said harmonic.

7. The method of damping a follow-up device employing an alternating current error signal and a two phase induction motor which consists in supplying one winding of the motor with current of the fundamental and second harmonic of the power frequency supplying the other winding with current of the fundamental only of the power frequency, and short-circuiting said other winding for said second harmonic.

ERNEST HENRY SCHMIDT, Jr.

REFERENCES CITED

The following references are of record in the file of this patent:

UNITED STATES PATENTS

| Number | Name | Date |
|---|---|---|
| 602,921 | Steinmetz | Apr. 26, 1898 |
| 602,965 | Rice et al. | Mar. 14, 1899 |
| 2,303,654 | Newton | Dec. 1, 1942 |